Patented May 21, 1929.

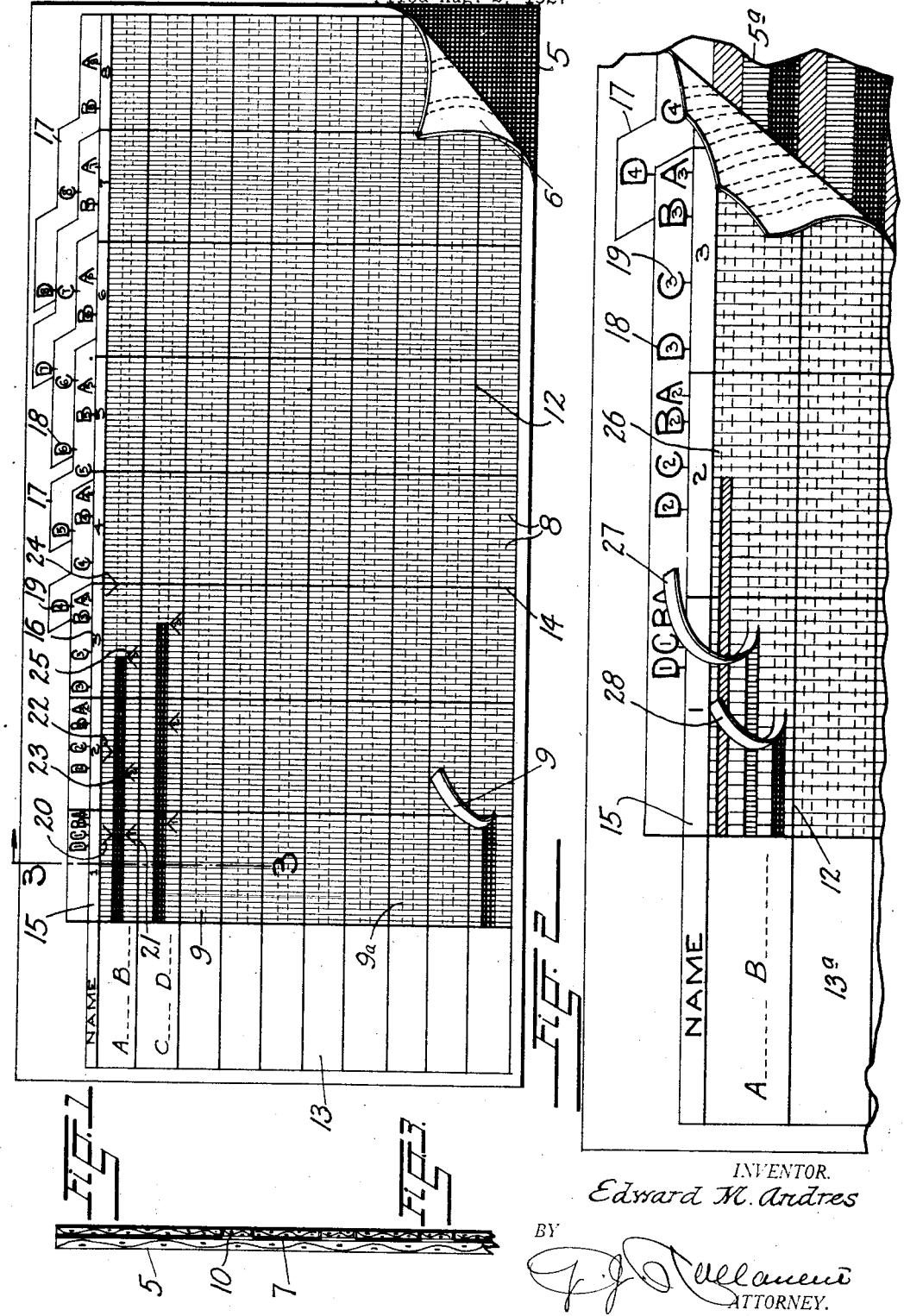

1,713,811

UNITED STATES PATENT OFFICE.

EDWARD M. ANDRES, OF GUNNISON, COLORADO, ASSIGNOR OF ONE-HALF TO RUSSELL W. TALLMAN, OF GUNNISON, COLORADO.

GRAPHIC CHART.

Application filed August 2, 1927. Serial No. 210,084.

My invention relates to graphic charts, and especially to charts that show comparatively the progress made in certain subjects or by various individuals.

An object of the invention is to provide such a chart that is easily altered from time to time to indicate such progress.

Another object is to eliminate the use of curves in denoting progress because of the confusing nature of a number of curves superimposed on the same chart, and to provide a compact chart that may be used for a number of subjects or individuals without confusion.

A further object is to provide a plurality of distinguishable scales for each subject of individual.

Other objects reside in details of construction which will more fully appear in the course of the following description.

In the drawings, in which like reference characters designate like parts in the several views, Figure 1 designates a face view of a chart embodying the foregoing features;

Figure 2, an enlarged view of a portion of a modified form of the chart; and

Figure 3, an enlarged section taken on the line 3—3 of Figure 1.

Referring more specifically to the drawings, the chart is composed of a back member and a face member or sheet 6 fastened upon the back.

The face of the back member 5 preferably is of a distinctive color, black being shown on the drawings, and the face of the sheet 6 has a color contrasting with that of the back.

The sheet 6 is preferably ruled horizontally as at 12, and vertically as at 8. In the drawings the vertical ruling is divided by heavier lines 14 into groups of twenty hereinafter called "columns."

The sheet 6 has furthermore a number of removable strips 9 divided by parallel perforated or otherwise weakened lines 9ª. Each of the horizontal divisions of the sheet is shown as having one or more of these strips, and spaces 13 are provided at an end of the removable strips for insertion of the names of subjects, individuals, teams, shifts, and the like. Spaces 15 may be provided at the heads of the columns for consecutive numbers 16.

The sheet 6 is by means of a suitable adhesive shown at 7 in Figure 3, pasted upon the face of the back member over its entire extent excepting the spaces corresponding with the narrow strips 9 defined by the weakened lines 9ª so that the strips may be torn out of the sheet as desired.

Above the columns and cooperative therewith are tiers of cumulative alphabetical designations 18, preferably arranged in "corridors" 17.

The present chart may be used for commercial charting, salesmen's records, machine output, school charting, etc. However, the application to school purposes only will be described.

The letters 18 have been arbitrarily given the following numerical values:
"A"=95%.
"B"=90%.
"C"=80%.
"D"=70%.

These percentages are on the basis of 100%.

In the use of the chart for school purposes, the names of the subjects or pupils are placed in the spaces 13. After the grade of a pupil is determined for the first unit of work (an examination, a month's average, a week's attendance, a theme, or whatever the unit is), the respective strip is torn off a corresponding distance. For instance, if the grade is 80% for the unit of work, the strip is torn off sixteen of the twenty spaces in column No. "1", as indicated by the carets 20 and 21 in Figure 1. The caret 20 represents the grade for the unit of work and the caret 21 represents the cumulative grade to date. Of course they are the same for the first unit.

The earnings of the pupil for the second unit are indicated with reference to the designations in the tiers by still further tearing the respective strip from the sheet fastened upon the back of the chart and in this manner the progress made by the pupil is graphically shown without the use of curves.

It will be noted that the removal of the strips exposes the face of the back member of the chart which as stated before is colored in contrast with the face of the superimposed sheet so that the grade indications are clearly distinguishable and easily read. It will also be seen that the accumulative efforts of a number of pupils may be indicated on one and the same chart without confusion.

The method of designating the progress made by school pupils or others in their respective occupations by reference to the tiers of grade designations above the ruled body portion of the chart has been made the subject of a separate application for Patent Serial No. 210,085, filed August 2, 1927. No further explanation of the method is therefore necessary at this time.

The modified form shown in Figure 2 varies from that just described and shown only in that (a) the back 5ª has a series of stripes preferably of different colors,—green, red, and black for example, indicated in colors or by distinctive cross-hatching as in the drawings, (b) the sheet 6 has between the lines 12, pluralities of removable strips corresponding with the series of stripes, and (c) the spaces for the names of the subjects or individuals are opposite the pluralities of strips instead of one as in the first described form.

In using the modified form, the same procedure may be followed except that the plurality of removable strips 26, 27 and 28 opposite each name may represent three branches of study, such as spelling, arithmetic and grammar, of the same pupil.

Inasmuch as the stripes on the face of the background beneath the removable strips are differently colored, the progress made in the different branches of study is readily seen without the possibility of confusion as might occur in case the background had but one color as in the first described form of the invention.

Having thus described my invention, what I claim and desire to secure by Letters Patent is:—

1. A chart of the character described comprising a base member having a background, and upon the same, a face member of contrasting color, provided with removable strips between weakened lines, the face member being fastened upon the base member exclusive of the strips whereby the latter may be torn out to expose the background beneath them.

2. A chart of the character described comprising a base member having a multi-colored background, and upon the same, a face member of contrasting color, provided with removable strips between weakened lines, the strips corresponding in position with the different colors of the background, and the face member being fastened upon the base member exclusive of the strips whereby the latter may be torn out to expose the background beneath them.

3. A chart of the character described comprising a base member having a background, and upon the same, a ruled face member of contrasting color, provided in transverse relation to its ruling with removable strips, the face member being fastened upon the base member exclusive of the strips whereby the latter may be progressively removed to expose the background beneath them.

4. A chart of the character described comprising a base member having a background, and upon the same, a face member of contrasting color provided with removable strips, the face member being fastened upon the base member exclusive of the strips whereby the latter may be removed to expose the background.

5. A chart of the character described comprising a base member having a background of series of differently colored stripes, and upon the base member, a face member having series of removable strips corresponding in position with the series of stripes, the face member being fastened upon the base member exclusive of the strips whereby the latter may be removed to expose the background.

6. A chart of the character described comprising a base member, a face member upon the base member provided with a removable strip, a portion of the face member other than the removable strip being fastened upon the base member, whereby all or a portion of the strip may be removed to expose the base member.

7. A chart of the character described comprising a base member, a face member of contrasting color upon the base member provided with a removable strip, a portion of the face member other than the removable strip being fastened upon the base member whereby all or a portion of the strip may be removed to expose the base member.

8. A chart of the character described comprising a base member having a multi-colored background, a face member upon the base member provided with removable strips corresponding in position with the colors of the background, a portion of the face member other than the removable strips being fastened upon the base member, whereby all or a portion of each strip may be separately removed to expose the background.

In testimony whereof I have affixed my signature.

EDWARD M. ANDRES.